3,040,012
NEW POLYMERIZATION PROCESS OF BASIC
COMPOUNDS
Arthur Maeder, Therwil, Switzerland, assignor to Ciba
Limited, Basel, Switzerland, a Swiss firm
No Drawing. Filed June 1, 1959, Ser. No. 817,041
Claims priority, application Switzerland Apr. 7, 1957
10 Claims. (Cl. 260—89.7)

This is a continuation in part of my application Serial No. 726,635 filed April 7, 1958, and now abandoned.

It is known to polymerize monomeric basic compounds containing a carbon-to-carbon double bond and a tertiary amino group or to copolymerize them with other compounds that likewise contain a carbon-to-carbon double bond.

In performing such reactions said basic compounds were neutralized with an organic or inorganic acid, and the reaction product was polymerized with the addition of a catalyst. Without the addition of acid—that is to say in the presence of a free tertiary amino group—it was as a rule very difficult or even impossible to bring about polymerization of said monomers, more especially so when the proportion of the basic polymerization component was more than 10% of the weight of the mixture of monomers.

It is also known that basic acrylamides, for example acrylic acid-γ-dimethylaminopropylamide, strongly inhibit the polymerization of acrylonitrile in solution so that only a small amount of grey-brown polymer is formed. Complete replacement of oxygen by nitrogen in this polymerization does not produce an improvement. Furthermore it is known to polymerize monomers containing a basic tertiary amino group under an atmosphere of nitrogen, helium or carbon dioxide in which procedure the air in the reaction vessel is first replaced by the inert gas and after the reactants are introduced, a blanket of the inert gas is maintained by continuously introducing said gas above the surface of the reaction medium. Carbon dioxide has also been used to prepare carbonates of basic monomers. For this purpose, carbon dioxide is introduced into an ice-cooled reaction mixture and polymerization is effected at this low temperature with the aid of ultraviolet light. The low temperature is necessary to prevent the decomposition of the unstable carbonates, and ultraviolet light is used for polymerizing the monomers at this low temperature. After polymerization, the polymers must be freed from the carbonic acid salt by a heat treatment.

The present invention is based on the observation that such basic monomers can be homopolymerized or copolymerized in a surprisingly simple and advantageous manner with polymerization catalysts in an organic or an aqueous medium when the reaction medium is saturated with carbon dioxide under atmospheric pressure and preferably at a temperature between 20 and 40° C. by introducing carbon dioxide through an inlet tube, and then the polymerization is effected under atmospheric pressure and at a temperature between 20 and 95° C., preferably between 50 and 90° C., a slight stream of carbon dioxide bubbling through the same inlet tube into the reaction mixture throughout the reaction period.

The process of the invention has the additional great advantage that after polymerization the polymers are present in their free base state, no further step being necessary to obtain the free polymers as, for example, when the salts of monomeric basic compounds are polymerized.

The present invention provides a process for the manufacture, with the aid of a polymerization catalyst, of linear additive polymers from monomeric organic compounds containing one polymerizable ethylenically unsaturated carbon-to-carbon bond and 1 to 2 basic tertiary amino groups, each separated from said unsaturated carbon-to-carbon bond by a chain of 1 to 5 atoms, which process comprises saturating the polymerization medium under atmospheric pressure with carbon dioxide and polymerizing the monomeric compounds at a temperature between 20 and 95° C. under atmospheric pressure, a slight stream of carbon dioxide bubbling through the reaction mixture throughout the reaction period.

The term "compounds containing one polymerizable ethylenically unsaturated carbon-to-carbon bond" refers to compounds containing the grouping $>C=C<$ and preferably those containing the grouping $CH_2=C<$ which are both homopolymerizable and copolymerizable, as well as to those which are only copolymerizable.

The stipulation that the basic tertiary amino groups must be separated from the unsaturated carbon-to-carbon bond by a chain of 1 to 5 atoms, excludes compounds containing a $CH_2=CH-$ group directly attached to the basic nitrogen atom. The atoms of the chain may be carbon, nitrogen or oxygen and of the carbon atoms of a 6-membered carbocyclic system only four carbon atoms are regarded as being members of the chain. Examples of compounds in which the tertiary amino group is separated from the double bond by 1, 4 or 5 atoms are 2-vinylpyridine, acrylic acid-β-dimethylaminoethylamide and 4-(N:N-dimethylaminomethyl)-styrene.

The polymerizable compounds, as defined above, containing 1 to 2 basic tertiary amino groups, are free from groups reacting with the amino groups, such as carboxylic groups. They may belong to the following classes of compounds:

(a) Basic amides of α:β-monoethylenically unsaturated aliphatic carboxylic acids containing 3 to 5 carbon atoms, which amides contain in the amide portion of the molecule 1 to 2 tertiary amino groups separated from the amide nitrogen atom by a divalent hydrocarbon radical containing 2 to 6 carbon atoms, (b) Basic esters of α:β-monoethylenically unsaturated aliphatic carboxylic acids containing 3 to 5 carbon atoms, which esters contain in the ester portion of the molecule 1 to 2 tertiary amino groups separated from the ester oxygen atom by a divalent hydrocarbon radical containing 2 to 6 carbon atoms, (c) Basic vinyl-ethers containing one tertiary amino group and one atomic grouping $CH_2=CH-O-$ which is bound to a divalent alkylene group containing 1–3 carbon atoms, (d) Basic vinyl heterocyclic compounds containing one $CH_2=CH-$ group which is bound directly to a carbon atom of a heterocyclic ring containing 1 to 2 basic nitrogen atoms, (e) Basic vinyl aryl compounds containing one $CH_2=CH-$ group which is bound directly to a carbon atom of an aryl radical substituted at another carbon atom by a basic atomic grouping, and (f) Allylamines in which the amino group is present as a basic tertiary amino group.

The compounds of the classes a, b, c, e and f preferably used correspond to the general Formula 1

(1)

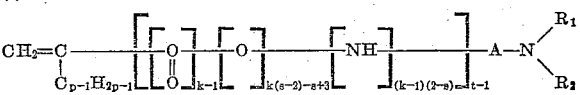

wherein $k$, $t$, $s$ and $p$ each represent an integer from 1 to 2, A represents a hydrocarbon radical containing $t$ to $8-t$ carbon atoms, $R_1$ and $R_2$ taken singly are organic radicals containing 1 to 6 carbon atoms, and $R_1$ and $R_2$ taken jointly form a heterocyclic radical with the N atom, which heterocyclic radical contains 1 to 2 basic nitrogen atoms.

When $R_1$ and $R_2$ are taken singly, they represent preferably hydrocarbon radicals having 1–6, and advantageously 1–2, carbon atoms, or hydrocarbon radicals substituted by hydroxyl groups having 1–4, and preferably 1–2, carbon atoms.

When $t=2$, $k=2$ and $s=1$ the Formula 1 stands for an amide of the formula (2) 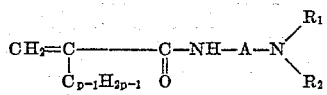

When $t=2$, $k=2$ and $s=2$ the Formula 1 stands for an ester of the formula (3) 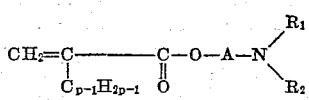

When $t=2$, $k=1$ and $s=1$ or 2 the Formula 1 stands for an ether of the formula (4) 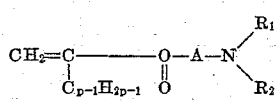

When $t=1$ the Formula 1 stands for a vinyl compound of the formula (5) 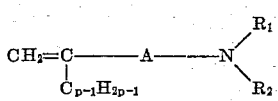

When $t=2$ (Formulae 2, 3 and 4) the hydrocarbon radical A consists of 2 to 6 carbon atoms and can be aliphatic or carbocyclic. For example the radicals —CH$_2$CH$_2$—, —CH$_2$CH$_2$CH$_2$— or

may be mentioned.

When $t=1$ (Formula 5) the hydrocarbon radical A consists of 1 to 7 carbon atoms and can be aliphatic or carbocyclic. For example the radicals —CH$_2$—, —CH$_2$—CH$_2$—

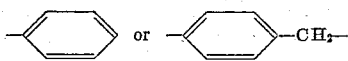

may be mentioned.

The statement in Formula 1 and in below Formula 6 that the radicals $R_1$ and $R_2$ taken jointly form a heterocyclic radical with the N atom means that compounds with a tertiary amino group of the formula

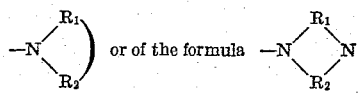

come into consideration, the ring which is advantageously saturated being preferably bound to the polymerizable —CH=C< group through a carbon bridge and a hetero atom. As an example there may be mentioned acrylic acid-β-N-morpholinoethyl amide.

Compounds of the classes $a$ and $b$ and corresponding to the Formulae 2 and 3 are especially suitable for use in the process of this invention. In these classes of compounds there are especially suitable for homopolymerization, provided that the monomers are homopolymerizable, and also for copolymerization basic amides and basic esters of polymerizable mono α:β-unsaturated aliphatic monocarboxylic acids, which contain a single

group and a basic tertiary amino group in the amide or ester portion of the molecule, the tertiary nitrogen atom being linked with the amide nitrogen or the ester oxygen atom by a divalent hydrocarbon radical containing 2 to 6 carbon atoms. These basic amides and esters are derivatives of polymerizable or copolymerizable aliphatic monocarboxylic acids, containing 3 to 4 carbon atoms, such as crotonic acid, or α-chloracrylic acid, and especially methacrylic acid or acrylic acid, that is to say, acids of the formula

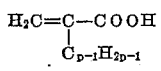

in which $p$ is the whole number 1 or 2.

These amides and esters are advantageously those of the general formula (6) 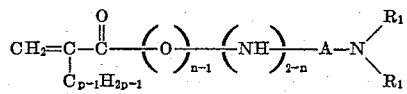

in which $p$ represents the whole number 1 or 2, $n$ represents the whole number 1 or 2, A represents a hydrocarbon radical constituting a bridge of at least two carbon atoms between the hetero atoms, and $R_1$ and $R_2$ represent hydrocarbon radicals of 1–6 carbon atoms, which may be substituted by hydroxy groups or which may be connected together to form a heterocyclic ring. When $n$ in the above formula is 1, the formula represents an amide of a copolymerizable acid, and when $n$ is 2, the formula represents a corresponding ester. The hydrocarbon radical A advantageously contains 2 to 6 carbon atoms, and it may be aliphatic or carbocyclic. For example, there may be mentioned the residues —CH$_2$CH$_2$—, —CH$_2$—CH$_2$—CH$_2$— or

As examples of basic amides of the Formula 2 or 6 there may be mentioned:

Acrylic acid-γ-diethylamino-propylamide,
Methacrylic acid γ-dimethylamino-propylamide,
Acrylic acid γ-di-(hydroxyethyl)-amino-propylamide,
Methacrylic acid β-diethylamino-ethylamide,
Acrylic acid β-dimethylamino-ethylamide,
Methacrylic acid (4-dimethylamino-cyclohexyl)-amide,
Acrylic acid (4-dimethylamino-phenyl)-amide,
Acrylic acid β-N-morpholine-ethylamide and
Acrylic acid β-pyrrolidino-ethylamide.

As examples of basic esters of the Formula 3 or 6 there may be mentioned:

Acrylic acid β-diethylamino-ethyl ester,
Acrylic acid β-dimethylamino-ethylester,
Methacrylic acid γ-diethylamino-propyl ester,
Acrylic acid γ-di-(2-cyanoethyl)-aminopropyl ester,
Acrylic acid γ-di-n-butylamino-propyl ester,
Acrylic acid γ-diphenylaminopropyl ester and
Acrylic acid (4-diethylaminophenyl)-ester.

Any desired diamines may be used for making the aforesaid amides, provided that the diamines contain a tertiary and an at most secondary amino group. There may be mentioned for example, α-amino-β-diethylaminoethane, α-amino-γ-diethylaminopropane, and also diamines which contain an aliphatic hydrocarbon radical of high molecular weight such as are obtainable by the additive combination of secondary monoamines of high molecular weight with acrylonitrile followed by reduction.

For making the aforesaid esters there may be used compounds which contain an esterifiable group (hydroxyl group) and a tertiary amino group, for example, tertiary alkanolamines, such as triethanolamine, dimethyl- or diethyl- or dibutyl-ethanolamine, dimethyl- or diethyl-propanolamine, N-methyl-N-octadecylamino-propanolamine or heterocyclic compounds such as oxyethyl-morpholine, and also dimethylamino-oxybenzene.

As further compounds of the classes $a$ or $b$ there may be mentioned basic amides or esters of α:β-unsaturated aliphatic dicarboxylic acids which contain a single >C=C< group and 5 or preferably 4 carbon atoms and contain in the amide or ester portion of the molecule preferably two tertiary amino-groups linked with the amide nitrogen atom or the ester oxygen atom by divalent hydrocarbon radical of 2 to 6 carbon atoms. These compounds are less suitable for homopolymerization, but are of advantage for copolymerization. As unsaturated dicarboxylic acids there may be mentioned maleic acid, itaconic acid and especially fumaric acid. Examples of such basic amides or esters are maleic acid γ-dimethyl-amino-propylamide, fumaric acid di-[γ-dimethylaminopropyl]-amide and fumaric acid di-[β-diethylaminoethyl] ester.

As examples of compounds of the class $c$ corresponding to Formula 4 there may be mentioned basic vinyl ethers containing tertiary amino groups, the $H_2C=CH-O-$ group of which is bound to an alkylene radical of 1 to 3 carbon atoms, for example, those containing only one tertiary amino group and only aliphatic radicals, or those containing only one tertiary amino group and, in addition to an aliphatic radical, only heterocyclic or only an aromatic radical containing only one ring, namely one 6-membered ring. As examples there may be mentioned β-diethyl-aminoethyl vinyl ether, β-di-n-butylaminoethyl vinyl ether, β-morpholinopropyl vinyl ether and 4-di-methylaminophenyl-(1)-methyl vinyl ether.

The basic vinyl-heterocyclic compounds of the class $d$ are compounds which contain a $CH_2=CH-$ group bound directly to a carbon atom of a heterocyclic ring which has 1–2 basic nitrogen atoms. As examples there may be mentioned vinyl-imidazoles, vinyl-quinolines such as 2-vinyl-quinoline, and especially vinyl-pyridines such as α- or γ-vinyl-pyridine, γ- or δ-ethyl-α-vinyl-pyridine, and also N-vinylcarbazole.

The basic vinyl-aryl compounds of the class $e$ corresponding to Formula 5 have a $CH_2=CH-$ group which is bound directly to a carbon atom of a benzene radical which is further substituted by a basic radical containing a tertiary amino group, for example: 2-(dimethylamino)-styrene, 4-(dimethylamino)-styrene, 2-(diethylamino)-styrene, 3-(diisopropylamino)-styrene, 4-(dimethylamino)-3-methylstyrene, 2:4-bis-(dimethylamino)-5-methyl-styrene, 3-(dimethylamino)-α-methylstyrene and 4-(n:n-dimethylamino-methyl)-styrene.

As compounds of class $f$ corresponding to Formula 5 there may be mentioned more especially N:N-dimethyl-allylamine and N:N-diethylallylamine, i.e. allylamines in which the amino group is a tertiary amino group.

When a copolymerization is to be carried out by the process of the invention, two or more different compounds may be used which have the constitution hereinbefore defined or at least one compound of that kind and one or more other copolymerizable compounds having no basic tertiary amino group may be used. As such compounds there may be mentioned more especially singly ethylenically unsaturated polymerizable compounds, which likewise contain a

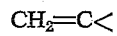

group, and especially a

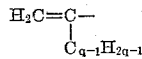

group in which $q$ represents the whole number 1 or 2, such as vinyl esters of organic monocarboxylic acids, for example, vinyl acetate, vinyl formate, vinyl butyrate, vinyl benzoate, vinyl alkyl ketones, vinyl compounds of inorganic acids, such as vinyl chloride, vinyl fluoride or acrylonitrile, vinylidene halides such as vinylidene chloride, or vinyl-aryl compounds such as styrene and substituted styrenes, and also compounds such as styrene and substituted styrenes, and also compounds of the acrylic acid series, such as esters of acrylic acid with alcohols or phenols that are free from tertiary amino groups, for example, ethyl acrylate, butyl acrylate, dodecyl acrylate, or acrylic acid amide and advantageously derivatives thereof substituted at the amide nitrogen, such as dioxy-ethyl-acrylic acid amide, N-tertiary butyl-acrylic acid amide and hexamethylol-melamine-triacrylic acid amide, and also analogous derivatives of methacrylic acid, α-chloracrylic acid, crotonic acid, maleic acid or fumaric acid. There may also be used polymerizable conjugated olefines such as isobutylene, butadiene or 2-chlorobutadiene. There are advantageously used derivatives of acrylic acid or methacrylic acid, which are free from basic tertiary nitrogen atoms, and among these derivatives especially the esters with aliphatic alcohols or the N-monosubstituted amides, in which an aliphatic substituent is bound to the amide nitrogen atom by a tertiary carbon atom.

As a rule, the basic compound containing a tertiary amino group is used in a proportion ranging from 2 to 98, and preferably from 10 to 90, percent on the total weight of the polymerizable compounds. The polymerizable compound free from tertiary amino groups is used in a proportion ranging from 2 to 98, and preferably from 10 to 90, percent by weight.

The polymerization may be carried out in bulk, in solution or in emulsion, the usual conditions for polymerization being used. There are used as polymerization catalysts inorganic and organic peroxide compounds, for example, peracetic acid, acetylperoxide, benzoyl peroxide, benzoyl-acetyl peroxide, lauroyl peroxide, cumene hydroperoxide, tertiary-butyl-hydroperoxide, para-menthane hydroperoxide, hydrogen peroxide, percarbonates, persulfates or perborates. In addition to the peroxide catalyst there may be used a catalyst of the "free radical" type, for example, azo-diisobutyronitrile. The proportion of the catalyst depends, as is known, on the course of reaction desired and the properties desired in the polymer. If desired, a plurality of agents capable of catalyzing the polymerization may be used. The action of the polymerization catalysts may be enhanced by the action of heat. In order to control the speed of reaction during the polymerization or to modify the molecular weight of the polymer, so-called regulators, for example, mercaptans, terpenes etc. may be added.

It is also of advantage to carry out the polymerization in the absence of air or oxygen. There may also be used, in addition to the aforesaid catalysts and regulators, so-called activators. Such activators are, for example, inorganic oxidizable oxygen-containing sulfur compounds, such as sulfur dioxide, sodium bisulfite, ammonium bisulfite, sodium hydrosulfite or sodium thiosulfate. The presence of the aforesaid activators together with oxygen-yielding polymerization catalysts forms so-called redox-systems, which favorably influence the course of polymerization. As activators there may also be used water-soluble aliphatic tertiary amines, such as triethanolamine or diethyl-ethanolamine. The action of the polymerization catalyst may also be accelerated by the addition of a heavy metal compound which is capable of existing in more than one valency stage and is present in reduced condition, or by the addition of a complex cyanide of iron, mercury, molybdenum, zinc, copper or silver or a mixture of such complexes.

In the process of this invention the polymerization is carried out in the presence of carbon dioxide, and this is accomplished in an advantageous and very simple manner by saturating the reaction mixture to be polymerized, for example, the emulsion or solution, with gaseous carbon dioxide, and taking care by the further addition of carbon dioxide during the polymerization that saturation is maintained as far as possible. Accordingly, the process of this invention is fundamentally different from the method hereinbefore referred to in which the reaction mixture is neutralised with an acid to facilitate the polymerization or an inert gas is introduced in order to exclude atmospheric oxygen. The fact that basic polymers are directly obtained is important from the practical point of view. Thus, if it is necessary to neutralize the polymer, the acid used for this purpose can be chosen according to the use for which the product is desired, irrespective of whether it was present in the preceding polymerization itself.

The polymerization may be carried out at ordinary temperature, but it is of advantage to work at a raised temperature. Suitable temperatures are, for example, those within the range of 20 to 95° C., and especially 50 to 90° C. Considerable quantities of heat are frequently liberated during the polymerizations, so that it is of advantage to have suitable cooling devices available so that the desired polymerization temperature can be maintained. This is especially necessary when a large quantity is to be polymerized in one operation. In order to utilise liberated heat and to facilitate control of the polymerization temperature it has been found advantageous in emulsion polymerizations and solution polymerizations in some cases to place only a part of the total quantity of emulsion in the polymerization apparatus, and to initiate the polymerization in that part of the emulsion. When that part of the emulsion or solution has reached the desired temperature, for example, 60–70° C., the remainder of the cold emulsion is run in in such manner that the temperature is kept constant. Towards the end of the polymerization it is often necessary to supply external heat.

Polymerization in emulsion is advantageously carried out by emulsifying the monomeric compounds with an emulsifying agent. As emulsifying agents there may be used cation-active or non-ionic emulsifying agents. Among the cation-active emulsifying agents there may be used, for example, compounds of higher fatty amines with acetic acid, hydrochloric acid or sulfuric acid, such as octadecylamine acetate, (dodecyl)-diethyl-cyclohexylamine sulfate, and also salts of diethylaminoethyl esters of higher fatty acids or salts of the type of oleylamidoethyl-diethylamine acetate,

There are also suitable quaternary ammonium compounds, such as cetyl-dimethyl-benzyl-ammonium chloride, cetyl-trimethyl-ammonium bromide, para-(trimethylammonium)-benzoic acid cetyl ester methosulfate, cetyl-pyridinium methosulfate, octadecyl-trimethyl-ammonium bromide or the quaternary compound of diethyl sulfate and triethanolamine tristearate.

Among the non-ionic emulsifying agents there may be mentioned polyglycol ethers of fatty acids, fatty amines or fatty alcohols of high molecular weight, such as cetyl alcohol, oleyl alcohol or octadecyl alcohol, for example, reaction products of 15–30 mols of ethylene oxide per mol of fatty alcohol. There may also be used emulsifying agents having a pronounced wetting action, such as octylphenol polyglycol ethers, and also lauric alcohol polyglycol ethers or polyhydric alcohols partially esterified with higher fatty acids, for example, glycerine monolaurate, or sorbital monolaurate. There may also be used mixtures of such emulsifying agents, or mixtures of such emulsifying agents with protective colloids, such as polyvinyl alcohols, partially hydrolyzed polyvinyl esters, or starches or starch derivatives, for example, dextrin, or cellulose ethers, polyethylene oxides, and also mixtures of emulsifying agents with water-soluble polymers or copolymers which contain free hydroxyl, amino or carboxylic acid amide groups. Finally, such protective colloids may be used alone.

When the polymerization is carried out in solution there may be used a solvent in which only the monomeric compounds are soluble and the polymers are insoluble. Alternatively, there may be used a solvent in which the polymer is soluble. Suitable solvents are, for example, water or organic solvents, such as methylene chloride, benzene or dichlorethane. It is especially advantageous to carry out the polymerization in a water-soluble solvent. As such water-soluble solvents there may be used more especially aliphatic alcohols of low molecular weight, such as methyl alcohol, ethyl alcohol, propyl alcohol or isopropyl alcohol, or a mixture of two or more such alcohols. The polymerization is advantageously carried out with the application of heat, more especially at the boiling temperature of the solvent, and with the addition of a peroxidic catalyst which is soluble in the reaction medium, for example, lauroyl peroxide.

Depending on the polymerization conditions and the nature of the starting materials used, the polymeric compounds are obtained in the form of viscous solutions granulates or emulsions. It is possible to use directly the products obtained by the polymerization without further working up. However, it is often preferable to work them up in a suitable manner. For example, there may be added modifying substances, such as plasticizers, for example, dibutyl phthalate, or dioctyl phthalate or a sebacic acid ester, or organic or inorganic pigments or fillers. The monomeric compounds may also be polymerized in the presence of a substratum. Thus, the polymerization may be carried out on a textile material. In this case the textile material is advantageously impregnated with a solution or emulsion of the monomer or monomers, and then the polymerization is carried out with the addition of a polymerization catalyst by heating the material. When there are used as starting materials amides or esters which are polymerizable and also hardenable, the polymerization and hardening may be carried out in two separate operations by first polymerizing the material and then subjecting it to hardening. Alternatively, both operations may be carried out simultaneously. Hardenable amides can easily be obtained in many cases, for example, by the additive combination of formaldehyde with the corresponding non-hardenable amide. For carrying out the hardening there are advantageously used hardening catalysts. As such catalysts the usual hardening catalysts, for example, acids, such as hydrochloric acid, sulfuric acid, or formic acid, may be used. There may also be used salts of strong acids with weak bases, for example, ammonium salts of strong inorganic or organic acids, such as ammonium chloride, ammonium sulfate, ammonium nitrate, ammonium oxalate or ammonium lactate. When solutions in organic solvents are used, there are used catalysts that are soluble in the organic solvent, for example, strong organic acids, such as formic acid, acetic acid or chloracetic acid, or compounds capable of splitting off acid when heated, such as diethyl tartarate or triacetin.

The copolymers obtainable by the process of this invention are useful for a very wide variety of purposes. Generally speaking they are useful for all purposes for which polymerization resins or polymerization and condensation resins are used. The products, if made from suitable starting materials, are suitable, inter alia, as assistants in the textile, leather and paper industries. They can be used for preparing impregnatings or coatings, for example, textiles of synthetic fibers, such as cellulose acetate artificial silk, polyamide fibers (nylon) or polyacrylonitrile fibers ("Orlon"), can be provided with an anti-static finish with suitably substituted polymers. Certain of the polymers are suitable as after-treatment agents for improving the fastness to washing and water of dyeings or prints on cellulosic textile materials produced with water-soluble direct dyeing dyestuffs, of which the solubility in water is due to the presence of sulfonic acid or carboxylic acid groups. Such an after-treatment may be combined with an after-treatment with a copper salt.

The polymers obtainable by the process of this invention can also be used as fixing agents for soluble dyestuffs in photographic films, or as binding agents for pigments, or for animalizing fibers, as binding agents for waxes or oils on paper or leather, as acid acceptors, as cationic precipitants, as stabilizers for chlorinated polymers, as moth-proofing agents in the form of fluosilicates, as thickening agents, emulsifying agents, sizing or adhesives.

The following examples illustrate the invention, the parts and percentages being by weight unless otherwise stated, and the relationship of parts by weight to parts by volume being the same as that of the kilogram to the liter:

Example 1

A reaction vessel of a capacity of 500 parts by volume, equipped with stirrer, reflux condenser and a tube for introducing gas, is charged with a solution of 150 parts of acrylic acid-γ-diethylaminopropylamide in 140 parts of distilled water and carbon dioxide gas is passed through for 2 hours at room temperature. The current of gas is then reduced and the bath is heated to 70° C. When the temperature has become constant, a solution of 0.1 part of potassium persulfate in 2 parts of distilled water is added, whereupon polymerization sets in immediately; it is accompanied by a temperature rise of about 20° C. and strong effervescence. ½ hour after the first addition of catalyst has been made, another 0.1 part of potassium persulfate dissolved in 2 parts of distilled water is added, and at intervals of 1 hour each another 3 additions of the same amount of potassium persulfate solution are made. After another hour the mixture is cooled to room temperature.

The yield of polymer, in the form of a highly viscous, clear, pale-yellow solution, is quantitative; this solution is miscible with water in any proportion and has a resin dry content of 50%. The product is the polymer containing free basic groups.

Example 2

Carbon dioxide gas is introduced for 15 minutes at room temperature into a mixture of 18 parts of a mixture of acrylic acid alkylamides (the alkyl-amine residues of which constitute a mixture of about 30% of palmitylamine, 40% of stearylamine, 20% of arachidylamine and 10% of behenylamine), 27 parts of acrylic acid-γ-diethylamino-propylamide, 2.25 parts of lauroylamidopropyl trimethylammonium methosulfate, 0.1 part of isooctanol and 85 parts of distilled water, contained in a reaction vessel of a capacity of 250 parts by volume, equipped with stirrer, reflux condenser and tube for introducing gas. The gas current is then reduced and the whole is raised to an internal temperature of about 65° C. When the temperature has become constant, a solution of 0.02 part of potassium persulfate in 2 parts of distilled water is added, whereupon a slight temperature rise of about 2 to 3° C. is observed. ½ hour after the first addition of catalyst, another 0.02 part of potassium persulfate in 2 parts of distilled water are added, and at intervals of 30 minutes each another four additions of 0.04 part of potassium persulfate in 4 parts of distilled water each are made. Finally, polymerization is carried on for ½ hour at an internal temperature of 70° C., and the whole is cooled to room temperature.

A finely dispersed, slightly thickened emulsion, free from coarse particles, of the copolymer containing tertiary amino groups is obtained, having a resin content of 30%. The yield of polymer amounts to 95% of the theoretical.

Example 3

A mixture of 13.5 parts of acrylonitrile, 9 parts of a mixture of acrylic acid alkylamides (the alkylamine residues of which constitute a mixture of about 30% of palmitylamine, 40% of stearylamine, 20% of arachidylamine and 10% of behenylamine), 22.5 parts of acrylic acid-γ-diethylamino-propylamide, 2.25 parts of lauroyl-amidopropyl trimethyl-ammonium methosulfate, 0.1 part of isooctanol and 85 parts of distilled water, is polymerized as described in Example 2.

An extensively thickened emulsion, free from coarse particles, of the basic copolymer is obtained; it has a resin content of 30%.

Example 4

A mixture of 9 parts of methacrylic acid methyl ester, 9 parts of a mixture of acrylic acid alkylamides (of which the alkylamine residues constitute a mixture of about 30% of palmitylamine, 40% of stearylamine, 20% of arachidylamine and 10% of behenylamine), 27 parts of acrylic acid-γ-diethyl-aminopropylamide, 2.25 parts of lauroyl-amidopropyl trimethyl-ammonium methosulfate, 0.1 part of isooctanol and 85 parts of distilled water, is polymerized as described in Example 2 (vigorous polymerization sets in even before addition of the catalyst at a bath temperature of 70° C.).

A thickened emulsion, free from coarse particles, of the copolymer containing tertiary amino groups is obtained; it has a resin content of about 30%. The yield of polymer amounts to 95% of the theoretical.

Example 5

Carbon dioxide gas is introduced for 15 minutes into a mixture of 30 parts of acrylic acid ethyl ester, 37.5 parts of acrylic acid-tertiary butylamide, 7.5 parts of acrylic acid-γ-diethylaminopropylamide, 3.75 parts of lauroylamido-propyl trimethylammonium methosulfate, 0.15 part of isooctanol and 145 parts of distilled water, contained in a reaction vessel having a capacity of 500 parts by volume, equipped with stirrer, reflux condenser and tube for introducing gas. The gas current is then reduced and the whole heated to an internal temperature of 50° C. When the temperature has become constant, a solution of 0.05 part of potassium persulfate in 5 parts of distilled water is added, whereupon the temperature rises by about 30° C. within 5 minutes. One hour after the first addition of catalyst, another 0.05 part of potassium persulfate in 5 parts of distilled water is added, and polymerization of the mixture is completed at an internal temperature of about 70° C. At intervals of 1 hour each another four additions are made of 0.05 part of potassium persulfate in 5 parts of distilled water each. After another 1½ hours the whole is cooled to room temperature.

A thinly liquid emulsion is obtained of the copolymer containing free basic groups; it is well dispersed and has a dry content of 30%. The yield of polymer amounts to 98% of the theoretical.

Example 6

A mixture of 22.5 parts of acrylic acid ethyl ester, 37.5 parts of acrylic acid tertiary butylamide, 15 parts of acrylic acid-γ-diethylaminopropylamide, 3.75 parts of lauroyl-amidopropyl trimethylammonium methosulfate, 0.15 part of isooctanol and 145 parts of distilled water is polymerized as described in Example 5.

A finely dispersed emulsion of salve-like consistency, having a dry content of about 30%, is obtained. The yield of polymer is almost quantitative. A copolymer containing free amino groups is formed.

Example 7

A mixture of 30 parts of styrene, 7.5 parts of fumaric acid-di-[γ-dimethylaminopropylamide], 1.5 parts of lauroyl-amidopropyl trimethylammonium methosulfate, 0.1 part of isooctanol and 67.5 parts of distilled water is heated to an internal temperature of 65° C. as described in Example 2, vigorous polymerization setting in even before addition of the catalyst. This solution is treated with a solution of 0.05 part of potassium persulfate in 5 parts of distilled water and polymerization is conducted for 4 hours at a bath temperature of 70° C., during which time another four equal additions of potassium persulfate solution are made.

The basic copolymer is obtained as a thinly liquid, highly dispersed emulsion having a resin dry content of 29%.

Example 8

A mixture of 28.15 parts of styrene, 9.35 parts of crotonic acid-β-diethylamino-ethylamide, 1.5 parts of lauroylamidopropyl trimethylammonium methosulfate, 0.1 part of isooctanol and 67.5 parts of distilled water is heated to an internal temperature of 65° C. as described in Example 2. When the temperature has become constant, a solution of 0.05 part of potassium persulfate in 5 parts of distilled water is added, and polymerization is carried on at 70° C. bath temperature for 4 hours during which time the same amount of potassium persulfate solution is added four more times. The basic copolymer is obtained in the form of a thinly liquid, highly dispersed emulsion having a resin dry content of about 28%.

*Example 9*

A mixture of 63.75 parts of acrylonitrile, 11.25 parts of acrylic acid-γ-diethylaminopropylamide, 1.5 parts of laurolyamidopropyl trimethylammonium methosulfate, 0.1 part of isooctanol and 145 parts of distilled water is heated to an internal temperature of about 50° C. as described in Example 2. When the temperature has become constant, a solution of 0.05 part of potassium persulfate in 5 parts of distilled water is added, whereupon polymerization sets in. Polymerization is carried on for another 4½ hours at a bath temperature of 60 to 65° C., and during this time another four additions are made of 0.05 part of potassium persulfate in 5 parts of distilled water at equal intervals.

The resulting suspension of the basic copolymer is filtered, the filter residue is thoroughly washed with hot water and dried until its weight has become constant. The basic copolymer is easy to dye with acid dyestuffs in known manner.

When the aforementioned 11.25 parts of acrylic acid-γ-diethylaminopropylamide are replaced by 11 parts of acrylic acid-γ-dimethylaminopropylamide and the polymerization carried out in the same manner there is obtained a copolymer whose properties are similar to those of the above product.

*Example 10*

A mixture of 52.5 parts of acrylonitrile, 15.0 parts of acrylic acid tertiary butylamide, 7.5 parts of acrylic acid-γ-diethylaminopropylamide, 3 parts of lauroylamidopropyl trimethyl-ammonium methosulfate, 0.1 part of isooctanol and 145 parts of distilled water is heated to an internal temperature of about 50° C. as described in Example 2. When the temperature has become constant, a solution of 0.05 part of potassium persulfate in 5 parts of distilled water is added, whereupon polymerization sets in. By purifying the reaction product as described in Example 9, a basic copolymer is likewise obtained which is easy to dye with acid dyestuffs in known manner.

*Example 11*

A strong current of carbon dioxide gas is introduced for 10 minutes at room temperature into a mixture of 50 parts of acrylic acid-γ-diethylaminopropylamide, 50 parts of dibutyl-aminoethyl vinyl ether and 150 parts of benzene contained in a reaction vessel equipped with reflux condenser, stirrer, thermometer and tube for introducing gas. The current is then much reduced, and the mixture is heated to an internal temperature of 70° C. The temperature then rises to about 82° C. without supplying any external heat and without addition of catalyst. Polymerization is carried on for a total of 40 hours at an internal temperature of 85° C.; during the first 10 hours every hour 0.1 part of lauroyl peroxide, and during the remaining 30 hours every 1½ hours 0.1 part of azo-diisobutyronitrile are added. The whole is then cooled to room temperature.

A thinly liquid, clear, yellow solution is obtained. The resin yields an almost colorless, clear film having a very tacky surface. The resin is insoluble in water. The yield of polymer amounts to about 57%, the resin dry content being about 25 to 26%.

When the reaction is carried out in a current of nitrogen, but otherwise under identical conditions, the yield of polymer is only about 45%.

*Example 12*

A mixture of 60 parts of acrylic acid-γ-diethylaminopropylamide, 40 parts of fumaric acid diethyl ester and 150 parts of benzene is heated to an internal temperature of 85° C. as described in Example 11, and polymerization is carried on at that temperature for a total of 30 hours. During the first 15 hours, every 1½ hours, 0.1 part of lauroyl peroxide, and during the remaining 15 hours, every 1½ hours, 0.1 part of azo-diisobutyronitrile are added. The mixture is then cooled to room temperature.

A thinly liquid, yellowish orange, clear solution results. The resin yields a colorless, clear film having a distinctly tacky surface.

The yield of polymer amounts to about 94.5%, the resin dry content being about 40%.

*Example 13*

95 parts of acrylic acid-γ-diethylaminopropylamide are heated to an internal temperature of 60 to 62° C. as described in Example 11, and 0.1 part of lauroyl peroxide is then added. After a few minutes the temperature rises by about 5° C., and the internal temperature is then gradually raised to 75° C. Thereafter, at intervals of 1 hour each, alternating additions are made 5 times of 0.1 part of benzoyl peroxide each and 4 times of 0.1 part of lauroyl peroxide each, and 1 hour after the last addition of catalyst the mixture is cooled to room temperature.

An orange-yellow, highly viscous, clear polymer is obtained which gives a clear solution in cold water. In luke-warm water strong clouding occurs (hydrate formation in water; above about 30° C. the hydrate decomposes again). The yield of polymer is almost quantitative.

The same results are obtained when instead of acrylic acid-γ-diethylaminopropylamide the related acrylic acid-β-diethylaminoethylamide is used.

*Example 14*

45 parts of methacrylic acid-γ-diethylaminopropylamide are heated in a solution of 0.9 part of lauroylamidopropyl trimethylammonium methosulfate in 45 parts of water and 0.1 part of isooctanol to an internal temperature of 70° C. as described in Example 11. A solution of 0.05 part of potassium persulfate in 5 parts of water is added, and every two hours—9 more times—an identical amount of catalyst is added. 2 hours after the last addition the mixture is cooled to room temperature.

A yellowish, clear, thinly to medium viscous solution is obtained. Its resin dry content is about 30%, the yield of polymer being about 90%.

*Example 15*

A solution of 32 parts of methacrylic acid-γ-diethylamino-propylamide, 8 parts of acrylic acid ethyl ester and 60 parts of absolute ethanol is heated to an internal temperature of 75° C. as described in Example 11, and 0.1 part of benzoyl peroxide is then added. This addition of catalyst is repeated every 2 hours, 9 more times, and 2 hours after the last addition the mixture is cooled to room temperature.

A thinly liquid, clear, yellowish red solution is obtained which has a resin dry content of 34 to 35%. The yield of polymer amounts to 83 to 84%.

*Example 16*

A solution of 60 parts of acrylic acid isobutyl ester, 60 parts of acrylic acid-γ-diethylaminopropylamide and 180 parts of absolute ethanol is heated to an internal temperature of 70° C. as described in Example 11, and 0.12 part of lauroyl peroxide and 0.12 part of azo-diisobutyronitrile are then added. Thereupon the temperature rises by 8 to 10° C., and the external temperature is then raised slowly so as to maintain an internal temperature of 80° C. At intervals of 2 hours each the same amount of catalyst as above is added in all 9 more times, and after the last addition polymerization is carried on for another 4 hours, whereupon the mixture is cooled to room temperature.

A thinly viscous, almost clear solution is obtained; it has a resin dry content of about 40%. The yield of polymer amounts to 97 to 98%.

*Example 17*

52.25 parts of the resin solution obtained as described in Example 12 are completely freed from solvent while being stirred and heated at a bath temperature up to 100° C. The viscous resin mass which remains behind (20.9 parts) is stirred with 4.1 parts of 100% acetic acid and 25 parts of distilled water at about 60° C., a yellow, slightly turbid solution of pH 6.0 being formed.

To this solution are added 58.3 parts of monostearic acid glycol ester, the whole is heated to 80–90° C. and the molten ester is emulsified in the solution described above, another 50 parts of distilled water being added gradually during the emulsifying operation. There is obtained a beige-colored paste which keeps well during storage and which can be used as a salve base for various purposes.

In its salt-form, the copolymer described in Example 12 can thus be used as a special emulsifier for salve bases.

*Example 18*

2 parts of the emulsion described in Example 8 are mixed with 1000 parts of water. Knitted material of polyamide fibers treated in this mixture for 30 minutes at 25° C. while stirring regularly, after being centrifuged and dried at 60° C. and after-treated for a short while at 120° C., presents a pronounced, even matting effect.

*Example 19*

A mixture of 40 parts of 4-vinylpyridine in 60 parts of benzene is introduced into a reaction vessel of a capacity of 250 parts by volume equipped with reflux condenser, thermometer and a tube for introducing carbon dioxide, and a strong current of carbon dioxide gas is passed through the mixture for 10 minutes at room temperature. The current of gas is then considerably reduced and the whole is heated to an internal temperature of 70° C., the current of gas being maintained during the whole of the polymerization process at the rate last adjusted. When the temperature has become constant, 0.1 part of $\alpha:\alpha'$-azodiisobutyronitrile is added. Polymerization sets in after a few minutes and is evidenced by the mixture turning turbid and its temperature rising from 70 to 78° C. At intervals of 3 hours each, calculated from the first addition of catalyst, another five additions of 0.1 part of $\alpha:\alpha'$-azodiisobutyronitrile each are made, and 3 hours after the last addition of catalyst the mixture is cooled to room temperature.

The resulting polymer precipitates as a hard, yellowish mass. The yield of polymer is nearly quantitative.

*Example 20*

A mixture of 28 parts of $\beta$-diethylaminoethyl methacrylate, 12 parts of dihydroxyethyl methacrylamide and 60 parts of absolute alcohol is heated to an internal temperature of about 70° C. and carbon dioxide is used as described in Example 19. When the temperature has become constant, 0.1 part of $\alpha:\alpha'$-azodiisobutyronitrile is added and thereafter, at intervals of 4 hours each, this addition is repeated three more times. 7 hours after the last addition of catalyst the mixture is cooled to room temperature.

A yellowish, thinly viscous solution is obtained in which a gelatinous polymerizate is suspended.

*Example 21*

100 parts of N-dimethylaminoethyl vinyl ether are heated without these of a solvent to an internal temperature of about 90° C. and carbon dioxide is used as described in Example 19. When the temperature has become constant, 0.4 part of $\alpha:\alpha'$-azodiisobutyronitrile and 0.4 part of lauroyl peroxide are added, and this addition is repeated nine more times at intervals of 2 hours each. 2 hours after the last addition of catalyst the mixture is cooled to room temperature.

A dark brown, thinly liquid oil is obtained.

*Example 22*

A mixture of 70 parts of acrylonitrile, 15 parts of vinylidene chloride, 15 parts of para-dimethylaminophenyl acrylamide and 150 parts of methylene chloride is heated to an internal temperature of about 50° C. and carbon dioxide is used as described in Example 19. When the temperature has become constant, 0.1 part of $\alpha:\alpha'$-azodiisobutyronitrile and 0.1 part of lauroyl peroxide are added, and this addition is repeated nine more times at intervals of 2 hours each. 2 hours after the last addition of catalyst the mixture is cooled to room temperature.

The polymer settles out as a soft lump of resin. The solvent is removed and the resin is once more washed with fresh methylene chloride and dried in a vacuum cabinet at 130° C., and then powdered to yield a beige colored powder.

5 parts of this powder are heated for 2 hours on a boiling water bath with 20 parts of a 0.5% aqueous solution of a dyestuff of the formula

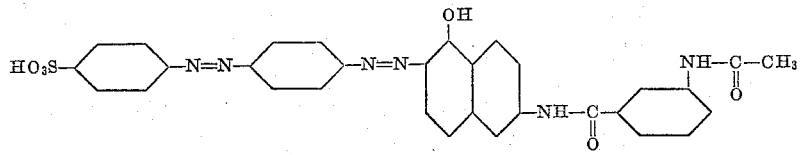

and 180 parts of distilled water, then cooled, suction-filtered, and the powder is washed on the filter with hot water until the filtrate has become colorless. The product is then dried in vacuo at 50° C.

*Example 23*

2.4 parts of lauroylamidopropyltrimethylammonium methosulfate are dissolved in 50 parts of distilled water, and 0.1 part of isooctanol, 33.6 parts of para-dimethylaminostyrene and 14.4 parts of fumaric acid-di-($\gamma$-dimethylaminopropylamide) are added. Carbon dioxide is introduced and the mixture is vigorously shaken and the resulting emulsion heated to an internal temperature of about 50° C. as described in Example 19. When the temperature has become constant, a solution of 0.05 part of potassium persulfate in 5 parts of distilled water is added. Polymerization sets in immediately and is evidenced by the temperature rising by about 5° C. When the temperature begins to drop again, the bath temperature is raised so that the internal temperature can be maintained at about 65° C. 2 hours after the first addition of catalyst another solution of 0.05 part of potassium persulfate in 5 parts of distilled water is added, and about ½ hour later the bath temperature is raised so that the internal temperature can be maintained at about 75° C. 3 hours after the second addition of catalyst the same amount of catalyst is added; this addition is repeated 3 hours later, and after another 3 hours the whole is cooled to room temperature.

A dark brown emulsion is obtained. The resin obtained therefrom by drying is insoluble in water.

Example 24

2.25 parts of lauroylamidopropyltrimethylammonium methosulfate are dissolved in 87 parts of distilled water, and 0.1 part of isooctanol, 9 parts of tertiary n-butyl acrylamide, 9 parts of N:N-dimethylallylamine and 27 parts of ethyl acrylate are added. Carbon dioxide is introduced and the mixture is vigorously shaken and the resulting emulsion heated to an internal temperature of 60° C. as described in Example 19. When the temperature has become constant, a solution of 0.045 part of potassium persulfate in 4.5 parts of distilled water is added. After 1 hour the internal temperature is raised by 10° C. After another hour another solution of 0.045 part of potassium persulfate in 4.5 parts of distilled water is added, and this addition is repeated twice more at intervals of 2 hour each. 2 hours after the last addition of catalyst the mixture is cooled to room temperature.

The copolymer obtained in this manner displays properties resembling those of rubber and is soluble in alcohol, acetone, dioxane, dimethyl formamide and other solvents.

Example 25

A mixture of 21.6 parts of hexamethylolmelamine triacrylamide, 14.4 parts of N:N-dimethylallylamine and 84 parts of water is heated to an internal temperature of about 50° C. and carbon dioxide is used as described in Example 19. When the temperature has become constant, 0.09 part of potassium persulfate is added. After a short time the reaction temperature has risen to 59° C., whereupon another 0.09 part of potassium persulfate is added. Polymerization is continued for 2 hours, the internal temperature is raised to about 65° C., another 0.09 part of potassium persulfate is added, the mixture is diluted with 20 grams of absolute alcohol, and after another 1½ hours a last addition of 0.09 part of potassium persulfate is made. 30 minutes after the last addition of catalyst the internal temperature is raised to 80° C., polymerization is continued for 3 hours and the mixture is then cooled to room temperature.

The precipitated polymer is suctioned off and dried at 50° C. in vacuum cabinet, powdered, and yields a beige-colored powder which is insoluble in water and dilute acids.

Example 26

A mixture of 28.15 parts of styrene, 9.35 parts of crotonic acid-β-diethylaminoethyl ester, 1.5 parts of dodecyl amido propyl trimethyl ammonium methosulfate, 0.1 part of iso-octanol and 67.5 parts of distilled water is heated to an internal temperature of 55° C. by introducing carbon dioxide in the manner described in Example 2. As soon as the temperature is constant, a solution of 0.04 part of potassium persulfate in 4 parts of distilled water is added, and polymerization carried out for 3½ hours at a bath temperature of 70–75° C., four more portions each 0.04 part of potassium persulfate solution being added during this period. The basic copolymer is obtained in the form of a thinly liquid, highly disperse emulsion which has a content of dry resin of about 25%.

2 parts of the afore-described emulsion are mixed with 998 parts of water. In the resulting liquor, a polycaprolactam fabric ("Perlon") is treated for half an hour at 25° C., and then dried at 60° C. This treatment gives the fabric a remarkable mat effect.

What is claimed is:

1. A process for catalytic polymerization of basic organic monomer in free base state in a polymerization medium to form linear additive polymer, which process consists essentially of (a) saturating the polymerization medium under atmospheric pressure with carbon dioxide, the catalyst in said polymerization medium being a free radical liberating catalyst and basic organic monomer in free base state in said polymerization medium containing one polymerizable ethylenically unsaturated carbon-to-carbon bond and 1 to 2 basic tertiary amino groups, each separated from said unsaturated carbon-to-carbon bond by a chain of 1 to 5 atoms, and (b) polymerizing said monomer at a temperature between 20° and 95° C. under atmospheric pressure while bubbling a slight stream of carbon dioxide through said polymerization medium throughout polymerization.

2. A process for catalytic polymerization of basic organic monomer in free base state in a polymerization medium to form linear additive polymer, which process consists essentially of (a) saturating the polymerization medium under atmospheric pressure with carbon dioxide, the catalyst in said polymerization medium being a free radical liberating catalyst and basic organic monomer in free base state in said polymerization medium containing one polymerizable ethylenically unsaturated carbon-to-carbon bond and one basic tertiary amino group, separated from said unsaturated carbon-to-carbon bond by a chain of 1 to 5 atoms, and (b) polymerizing said monomer at a temperature between 20° and 95° C. under atmospheric pressure while bubbling a slight stream of carbon dioxide through said polymerization medium throughout polymerization.

3. A process for catalytic polymerization of basic organic monomer in free base state in a polymerization medium to form linear additive polymer, which process consists essentially of (a) saturating the polymerization medium under atmospheric pressure with carbon dioxide, the catalyst in said polymerization medium being a free radical liberating catalyst and basic organic monomer in free base state in said polymerization medium containing one polymerizable ethylenically unsaturated carbon-to-carbon bond and two basic tertiary amino groups, each separated from said unsaturated carbon-to-carbon bond by a chain of 1 to 5 atoms, and (b) polymerizing said monomer at a temperature between 20° and 95° C. under atmospheric pressure while bubbling a slight stream of carbon dioxide through said polymerization medium throughout polymerization.

4. A process for catalytic polymerization of basic organic monomer in free base state in a polymerization medium to form linear additive polymer, which process consists essentially of (a) saturating the polymerization medium under atmospheric pressure with carbon dioxide, the catalyst in said polymerization medium being a free radical liberating catalyst and basic organic monomer in free base state in said polymerization medium containing one polymerizable ethylenically unsaturated carbon-to-carbon bond and 1 to 2 basic tertiary amino groups, each separated from said unsaturated carbon-to-carbon bond by a chain of 1 to 5 atoms, said basic organic monomer in free base state being selected from the group consisting of (1) basic amide of aliphatic α:β-monoethylenically unsaturated carboxylic acid containing 3 to 5 carbon atoms, which basic amide contains in the amide portion of its molecule 1 to 2 tertiary amino groups separated from the amide nitrogen atom by a divalent hydrocarbon radical containing 2 to 6 carbon atoms, (2) basic ester of aliphatic α:β-monoethylenically unsaturated carboxylic acid containing 3 to 5 carbon atoms, which ester contains in the ester portion of its molecule 1 to 2 tertiary amino groups separated from the ester oxygen atom by a divalent hydrocarbon radical containing 2 to 6 carbon atoms, (3) basic vinyl-ether containing one tertiary amino group and one atomic grouping $CH_2=CH-O-$ which is bound to a divalent alkylene group containing 1 to 3 carbon atoms, (4) basic vinyl heterocyclic compound containing one $CH_2=CH-$ group which is bound directly to a carbon atom of a heterocyclic ring containing 1 to 2 basic nitrogen atoms, (5) basic vinyl aryl compounds containing one $CH_2=CH-$ group which is bound directly to a carbon atom of an aryl radical substituted at another carbon atom by a basic atomic grouping and (6) allylamine in which the amino group is present as a basic tertiary amino group, and (b) polymerizing said monomer at a temperature between 20° and 95° C. under atmospheric pressure while bubbling a slight stream of carbon dioxide through said polymerization medium throughout polymerization.

5. A process for catalytic polymerization of basic organic monomer in free base state in a polymerization medium to form linear additive polymer, which process consists essentially of (a) saturating the polymerization medium under atmospheric pressure with carbon dioxide, the catalyst in said polymerization medium being a free radical liberating catalyst and basic organic monomer in free base state in said polymerization medium being a compound of the formula

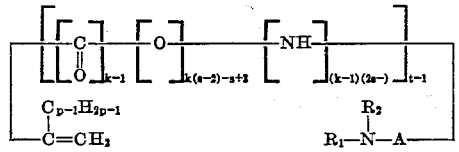

wherein each of $k$, $t$, $s$ and $p$ is an integer from 1 to 2; A is a hydrocarbon radical containing $t$ to $8-t$ carbon atoms; $R_1$ and $R_2$ taken singly are organic radicals containing 1 to 6 carbon atoms, and $R_1$ and $R_2$ taken jointly form a heterocyclic radical with the N atom, which heterocyclic radical contains 1 to 2 basic nitrogen atoms, and (b) polymerizing said monomer at a temperature between 20° and 95° C. under atmospheric pressure while bubbling a slight stream of carbon dioxide through said polymerization medium throughout polymerization.

6. A process for catalytic polymerization of basic organic monomer in free base state in a polymerization medium to form linear additive polymer, which process consists essentially of (a) saturating the polymerization medium under atmospheric pressure with carbon dioxide, the catalyst in said polymerization medium being a free radical liberating catalyst and basic organic monomer in free base state in said polymerization medium being a compound of the formula

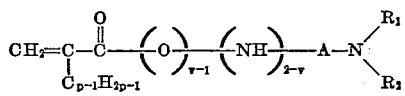

wherein each of $p$ and $v$ represents an integer from 1 to 2; A represents a hydrocarbon radical containing 2 to 6 carbon atoms; $R_1$ and $R_2$ taken singly are hydrocarbon radicals containing 1 to 6 carbon atoms, and $R_1$ and $R_2$ taken jointly form a heterocyclic radical with the N-atom, which heterocyclic radical contains 1 to 2 basic nitrogen atoms, and (b) polymerizing said monomer at a temperature between 20° and 95° C. under atmospheric pressure while bubbling a slight stream of carbon dioxide through said polymerization medium throughout polymerization.

7. A process for catalytic polymerization of basic organic monomer in free base state in a polymerization medium to form linear additive polymer, which process consists essentially of (a) saturating the polymerization medium under atmospheric pressure with carbon dioxide, the catalyst in said polymerization medium being a free radical liberating catalyst and basic organic monomer in free base state in said polymerization medium being a compound of the formula

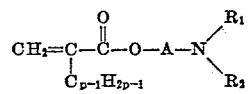

wherein $p$ represents an integer from 1 to 2; A represents a hydrocarbon radical containing 2 to 6 carbon atoms; $R_1$ and $R_2$ taken singly are hydrocarbon radicals containing 1 to 6 carbon atoms, and $R_1$ and $R_2$ taken jointly form a heterocyclic radical with the N atom, which heterocyclic radical contains 1 to 2 basic nitrogen atoms, and (b) polymerizing said monomer at a temperature between 20° and 95° C. under atmospheric pressure while bubbling a slight stream of carbon dioxide through said polymerization medium throughout polymerization.

8. A process for catalytic polymerization of basic monomer in free base state in a polymerization medium to form linear additive polymer, which process consists essentially of (a) saturating the polymerization medium under atmospheric pressure with carbon dioxide, the catalyst in said polymerization medium being a free radical liberating catalyst an basic organic monomer in free base state in said polymerization medium being a compound of the formula

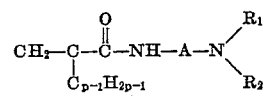

wherein $p$ represents an integer from 1 to 2; A represents a hydrocarbon radical containing 2 to 6 carbon atoms; $R_1$ and $R_2$ taken singly are hydrocarbon radicals containing 1 to 6 carbon atoms, and $R_1$ and $R_2$ taken jointly form a heterocyclic radical with the N atom, which heterocyclic radical contains 1 to 2 basic nitrogen atoms, and (b) polymerizing said monomer at a temperature between 20° and 95° C. under atmospheric pressure while bubbling a slight stream of carbon dioxide through said polymerization medium throughout polymerization.

9. A process for catalytic polymerization of basic organic monomer in free base state in a polymerization medium to form linear additive polymer, which process consists essentially of (a) saturating the polymerization medium under atmospheric pressure with carbon dioxide, the catalyst in said polymerization medium being a free radical liberating catalyst and basic organic monomer in free base state in said polymerization medium being the compound of the formula

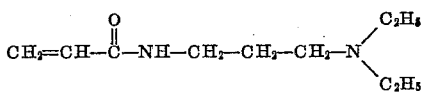

and (b) polymerizing said monomer at a temperature between 20° and 95° C. under atmospheric pressure while bubbling a slight stream of carbon dioxide through said polymerization medium throughout polymerization.

10. In a process for the catalytic manufacture from organic monomer of linear additive polymers in a polymerization medium, the improvement wherein (a) the catalyst is free radical liberating catalyst, (b) the monomer is basic organic monomer in free base state containing one polymerizable ethylenically unsaturated carbon-to-carbon bond and 1 to 2 basic tertiary amino groups, (c) the polymerization medium is saturated under atmospheric pressure with carbon dioxide and (d) said monomer is polymerized at a temperature between 20° and 95° C. under atmospheric pressure while bubbling a slight stream of carbon dioxide through said polymerization medium.

References Cited in the file of this patent

UNITED STATES PATENTS

| 2,138,762 | Harmon | Nov. 29, 1938 |
| 2,436,926 | Jacobson | Mar. 2, 1949 |
| 2,840,550 | Price | June 24, 1958 |
| 2,897,200 | Maeder et al. | July 28, 1959 |

OTHER REFERENCES

Schildknecht: "Vinyl and Related Polymers," pp. 225–226, John Wiley Sons Publishers, New York, N.Y. (1952).

UNITED STATES PATENT OFFICE
CERTIFICATE OF CORRECTION

Patent No. 3,040,012            June 19, 1962

Arthur Maeder

It is hereby certified that error appears in the above numbered patent requiring correction and that the said Letters Patent should read as corrected below.

Column 2, lines 61 to 64, formula 1, for that portion of the formula reading:

column 3, lines 20 to 23, formula 4 should appear as shown below instead of as in the patent:

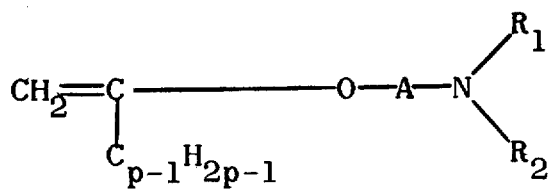

same column 3, line 69, the formula should appear as shown below instead of as in the patent:

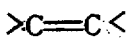

column 5, line 42, for "n:n" read -- N=N --; line 63, for "whidh" read -- which --; column 7, line 45, for "tristerate" read -- tristearate --; column 14, line 8, for "these" read -- the use --.

Signed and sealed this 6th day of August 1963.

(SEAL)
Attest:

ERNEST W. SWIDER            DAVID L. LADD
Attesting Officer            Commissioner of Patents

UNITED STATES PATENT OFFICE
CERTIFICATE OF CORRECTION

Patent No. 3,040,012                          June 19, 1962

Arthur Maeder

It is hereby certified that error appears in the above numbered patent requiring correction and that the said Letters Patent should read as corrected below.

In the heading to the printed specification, line 7, for "Apr. 7, 1957" read -- Apr. 10, 1957 --.

Signed and sealed this 7th day of April 1964.

(SEAL)
Attest:
ERNEST W. SWIDER

Attesting Officer

EDWARD J. BRENNER

Commissioner of Patents